(12) United States Patent
Yeh et al.

(10) Patent No.: US 12,397,821 B2
(45) Date of Patent: Aug. 26, 2025

(54) METRICS FOR MODELING CONSTRUCTION ZONES

(71) Applicant: GM Cruise Holdings LLC, San Francisco, CA (US)

(72) Inventors: Fu-Chun Yeh, San Diego, CA (US); Changkai Zhou, Mountain View, CA (US); Elad Plaut, Mountain View, CA (US); Shuqin Xie, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 116 days.

(21) Appl. No.: 18/323,823

(22) Filed: May 25, 2023

(65) Prior Publication Data
US 2024/0391488 A1    Nov. 28, 2024

(51) Int. Cl.
*B60W 60/00*    (2020.01)
*B60W 50/00*    (2006.01)

(52) U.S. Cl.
CPC ...... *B60W 60/001* (2020.02); *B60W 50/0097* (2013.01); *B60W 2420/403* (2013.01); *B60W 2420/408* (2024.01); *B60W 2554/20* (2020.02)

(58) Field of Classification Search
CPC .......... B60W 60/001; B60W 50/0097; B60W 2554/20; B60W 2420/408; B60W 2420/403
See application file for complete search history.

(56) References Cited

U.S. PATENT DOCUMENTS

| | | | |
|---|---|---|---|
| 2021/0199444 A1* | 7/2021 | Xie | G01C 21/32 |
| 2022/0126863 A1* | 4/2022 | Moustafa | B60W 60/0013 |
| 2023/0078779 A1* | 3/2023 | Eng | B60W 30/18159 701/117 |

* cited by examiner

*Primary Examiner* — Vivek D Koppikar
*Assistant Examiner* — Jeffrey R Chalhoub
(74) *Attorney, Agent, or Firm* — CANTOR COLBURN LLP

(57) ABSTRACT

Systems and methods for determining metrics for construction zone detection and evaluating the performance of construction zone detection. A construction zone can be manually labeled, and the human labels are converted to a format that can be input to a neural network. The neural network input represents polygons indicating the construction zone, as well as various construction zone objects. When an AV drives to the construction zone, the AV detects the construction zone objects and generates a predicted construction zone, including, for example, predicted edges. The predicted connectivity of the construction zone objects is evaluated to determine accuracy of the detected construction zone.

20 Claims, 11 Drawing Sheets

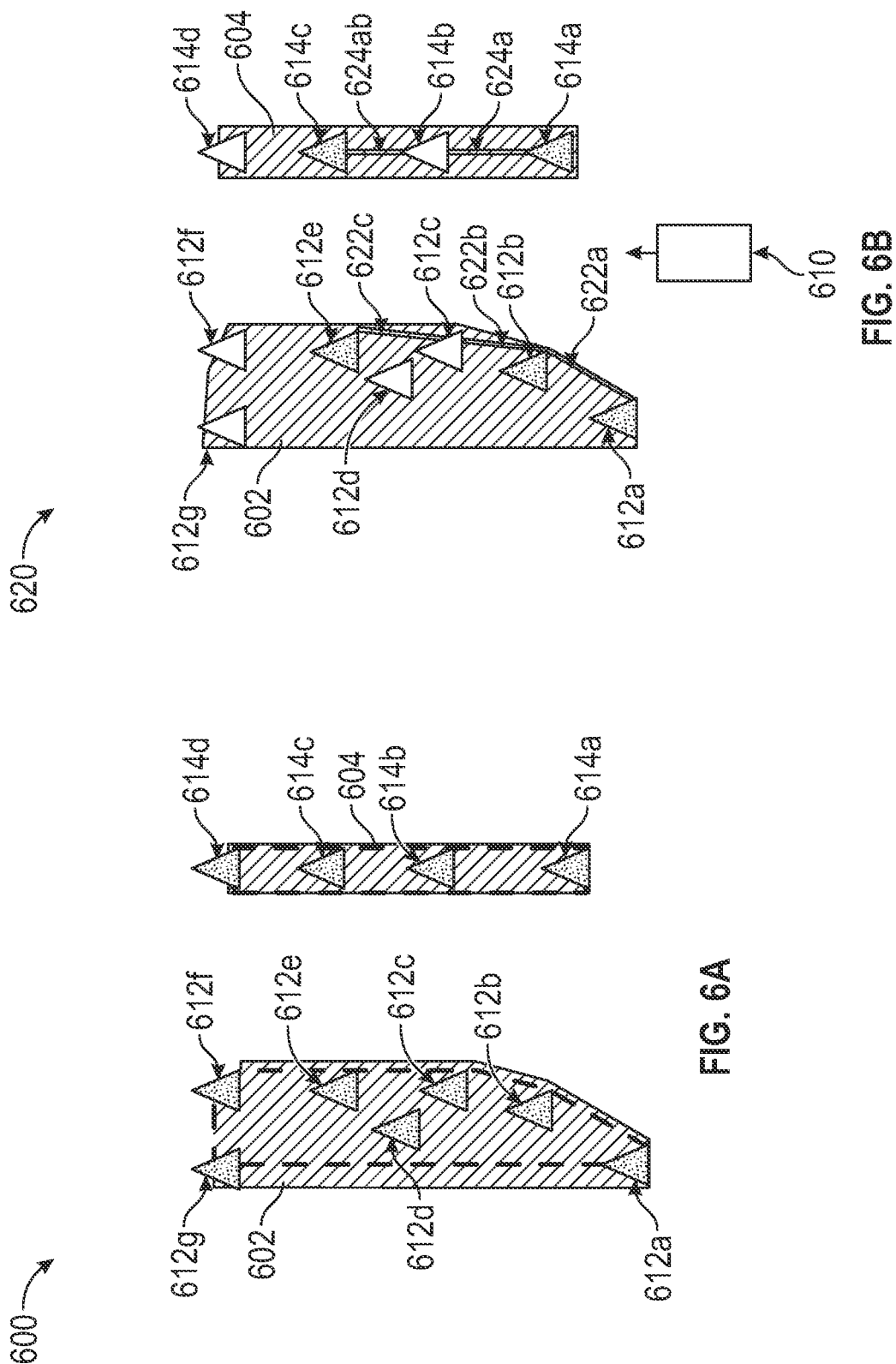

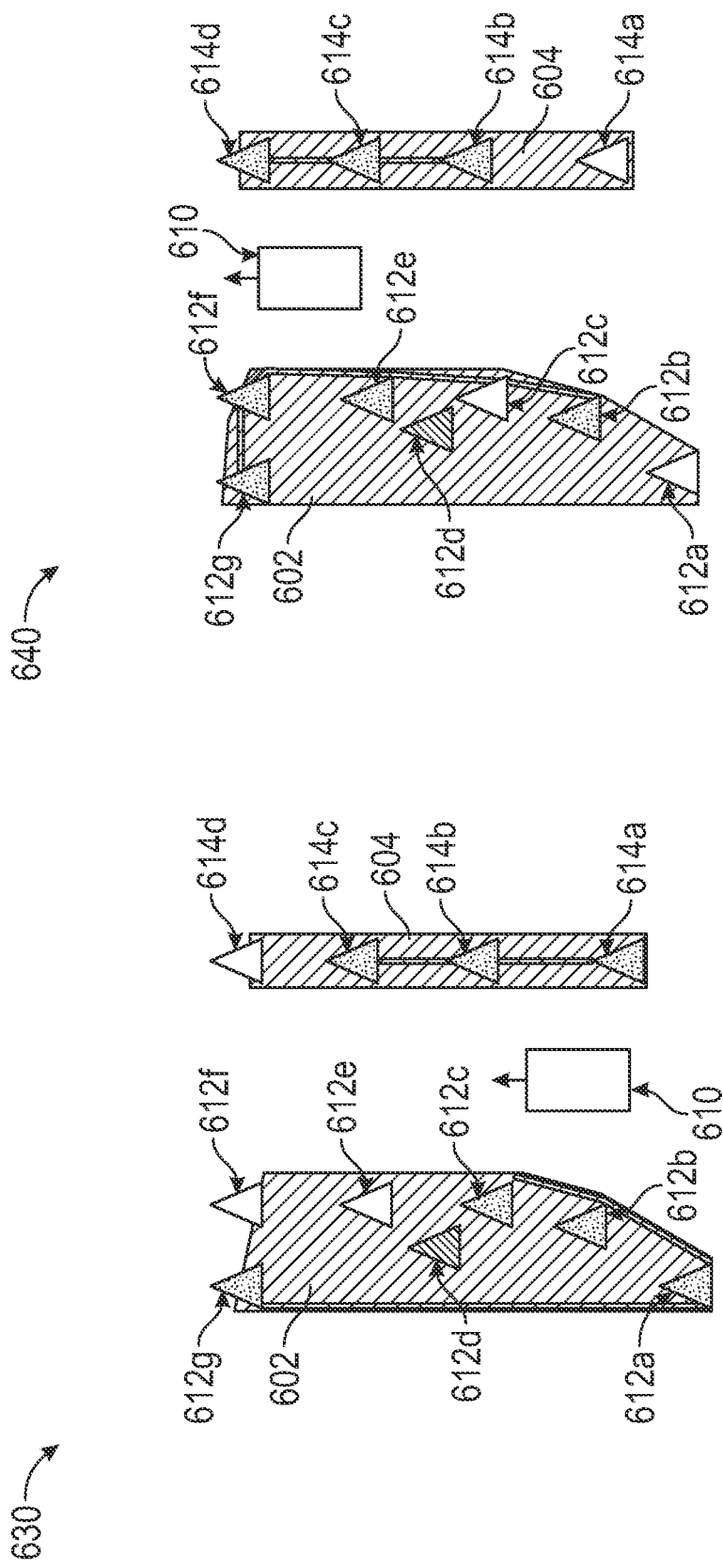

METRICS FOR MODELING CONSTRUCTION ZONES

CROSS-REFERENCE TO RELATED APPLICATIONS

This application is related to U.S. Non-Provisional Patent Application entitled "Metrics for Modeling Lane Closure Zones", filed concurrently herewith, the contents of which are incorporated herein by reference in their entirety and for all purposes.

TECHNICAL FIELD OF THE DISCLOSURE

The present disclosure relates generally to autonomous vehicles (AV) and, more specifically, to using neural networks to model construction zones for navigating AVs.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to drive the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 6A-6D show an example of the generation of predicted edges in construction zones, according to some examples of the present disclosure;

DESCRIPTION OF EXAMPLE EMBODIMENTS OF THE DISCLOSURE

Figure 1:
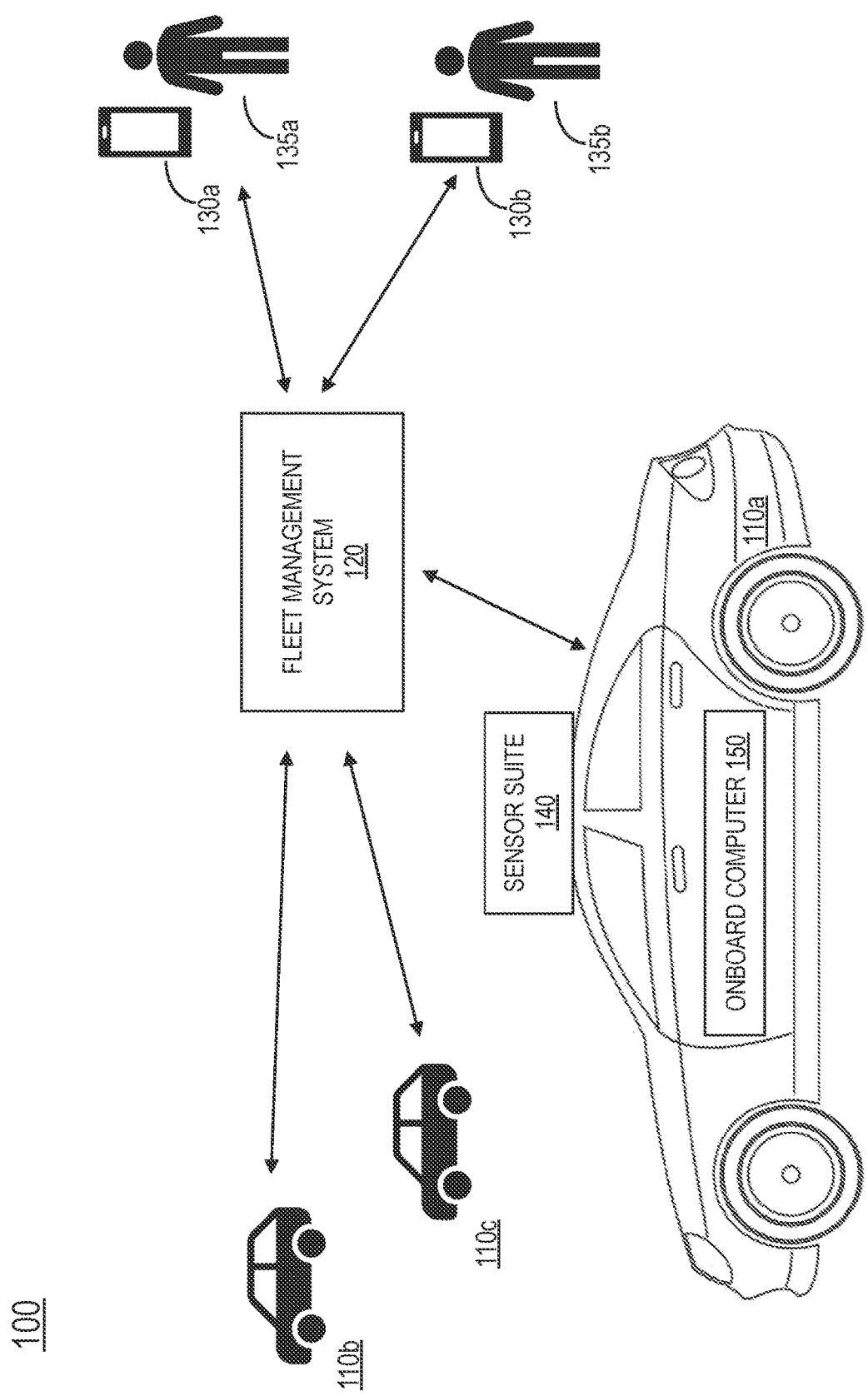
FIG. 1 illustrates a system including a fleet of AVs that can provide services to users, according to some examples of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless services, such as ride services, delivery services, and so on. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. AVs can provide other driverless services too, such as delivery service. A person can request an AV to deliver one or more items from one location to another location, and the person does not have to drive or be a passenger of the AV for the delivery.

Overview

AVs often need to drive near or through construction zones during their operations. A construction zone can include any area with construction zone objects on the road. Construction zone objects can include traffic cones, construction drums, traffic barrels, tubular construction markers, vertical panels, and traffic barriers. Construction zones can also be marked with temporary warning lights, reflectors, and construction signs. Construction zone objects can be used to mark temporary changes to the typical travel paths for vehicles on a roadway, which can include various roadway restrictions or directives such as lane closures, road closures, channelizations, etc. The changes to the typical travel paths for vehicles on the roadway can indicate that vehicles are to travel along a different path than that indicated on the maps the AVs use to operate. Thus, it is important for accurate driving operations of the AVs for the AVs to be able to interpret, in real time (or near real time), the changes to the typical travel paths indicated by the construction zone objects. Navigating through construction zones generally includes mapping (by the AV) construction zone objects in the construction zone and understanding related surrounding non-player characters (e.g., other vehicles).

According to various implementations, systems and methods are provided for determining metrics for construction zone detection and evaluating the performance of construction zone detection. In some examples, for a selected construction zone, the zone is manually labeled, and the human labels are converted to a format that can be input to a neural network. The neural network input represents polygons indicating the construction zone. The neural network uses the input to generate polygon boundaries. The polygon boundaries can be used to train the neural network. In particular, when an AV drives to the construction zone, the AV detects the construction zone objects and generates a predicted construction zone, including, for example, predicted edges. The AV data, including the detected construction zone objects, can be determined based on multiple data frames, captured over a selected time period. The data frames can vary based on the AV location with respect to the construction zone objects. The neural network determines the gap between the polygon boundaries and the predicted edges to determine the accuracy of the predicted construction zone and generate a performance metric. The predicted connectivity of the construction zone objects is evaluated to determine accuracy of the detected construction zone. In some examples, the labeled and predicted polygons can be interpreted in a graphical format. In various implementations, the neural network can include a convolutional neural network (CNN) and/or a graph neural network (GNN). In some examples, the generation of predicted edges and/or the generation of a predicted construction zone can be simulated. For instance, the performance metric can be used to determine the accuracy of the neural network in detecting construction zones. In some examples, the performance metric can be used to determine whether a neural network should undergo further training.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, or one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System with AV Fleet

FIG. 1 illustrates a system 100 including a fleet of AVs that can provide services to users, according to some embodiments of the present disclosure. The system 100 includes AVs 110a, 110b, 110c (collectively referred to as "AVs 110" or "AV 110"), a fleet management system 120, and client devices 130a and 130b (collectively referred to as "client devices 130" or "client device 130"). The client devices 130a and 130b are associated with users 135a and 135b, respectively. The AV 110a includes a sensor suite 140 and an onboard computer 150. Even though not shown in FIG. 1, the AV 110b or 110b can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 may also facilitate AVs to detect temporary traffic restrictions (TTRs), such as construction zones, for the AVs to safely navigate through or pass by the TTR zones. Certain aspects of the fleet management system 120 are described further in relation to FIG. 2.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135. The AV 110 may transmit one or more messages to the UI. The messages may be associated with one or more behaviors performed by the AV 110 for providing the ride to the user 135. The user 135 may view the messages in the UI. The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors.

The client device 130 may also provide the user 135 an UI through which the user 135 can interact with the fleet management system 120. For instance, the UI enables the user to submit a request for assistance to the fleet management system 120 through a network or a telephone service (e.g., a customer service hotline). The UI can further facilitate a communication between the user 135 and an agent of the fleet management system 120 who can provide the requested assistance. The UI may further enable the user to comment on or rate the agent.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 3.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

The onboard computer 150 supports a construction zone detection platform for detection of construction zone objects and determination of predicted edges to understand TTRs in environments where AVs 110 operates. The onboard computer 150 can detect construction zone objects based on sensor data generated by the sensor suite 140, and generate predicted edges. The sensor data can include multiple frames of sensor data, captured over a selected time period and/or over a selected distance traveled. The onboard computer 150 can input the sensor data, including the detected construction zone objects, into a neural network for generation of the predicted edges. The neural network performance can be evaluated based on, for example, the instant distance between the generated predicted edges and labeled edges. In various examples, when the neural network is trained, the onboard computer 150 can use the output of the trained model to plan and control navigation of the AV 110 surrounding or within the construction zone. In some examples, the onboard computer 150 can receive construction zone information from one or more other AVs 110 and/or from the fleet management system 120 (e.g., a map of the construction zone). Certain aspects of the onboard computer 150 are described further in relation to FIG. 4.

Example Fleet Management System

Figure 2:
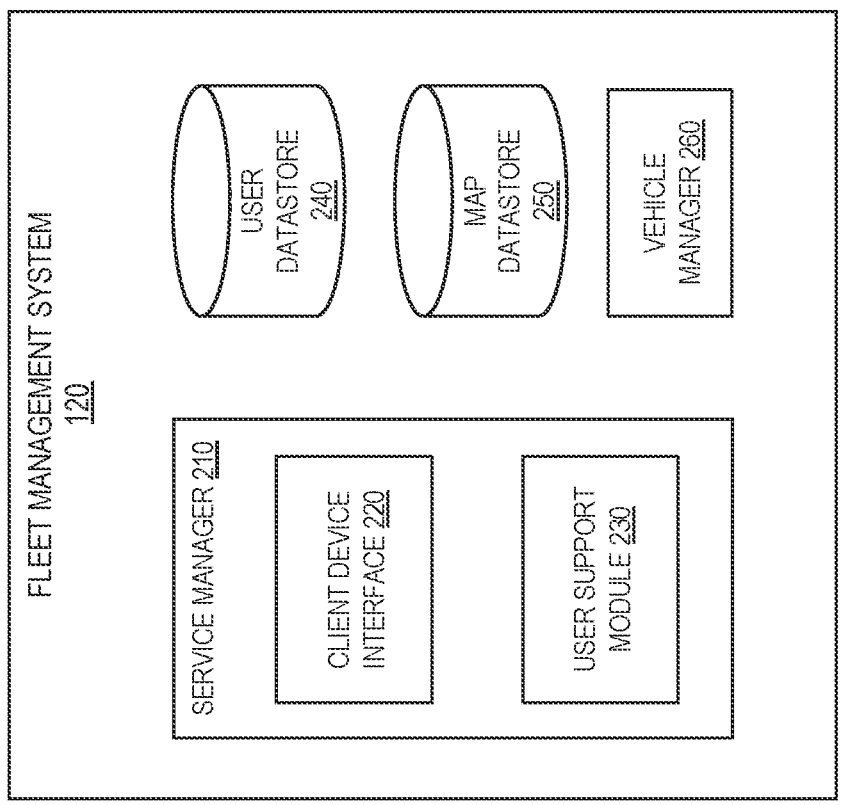
FIG. 2 is a block diagram showing a fleet management system, according to some examples of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 340 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that has not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

In some embodiments, the user support module 230 determines a state (e.g., a sentiment) of a passenger who submitted a support request and processes the support request based on the passenger's state. The user support module 230 may determine the passenger's state based on data of the passenger, data of the AV, data of one or more objects in an environment surrounding the passenger or AV, or some combination thereof. The data may include sensor data generated by the sensor suite 140 from detecting the passenger, AV, one or more objects in the environment, or some combination thereof. For instance, the user support module 230 may interface with AVs 110 (e.g., with onboard computers of the AVs 110) and receive sensor data from the AVs 110. The sensor data may be camera images, captured sound, measured temperature, other outputs from the sensor suite 140, or some combination thereof. The data may also include data retrieved by the user support module 230 from the user datastore 240 or map datastore 250. In an embodiment, the user support module 230 may provide the data to a trained model and the train model analyzes the sentiment of the passenger. The trained model may classify the passenger's sentiment. Example categories include negative (e.g., anxious, angry, etc.), neural (e.g., calm), positive (e.g., confident, happy, etc.), and so on. The trained model may also estimate a degree of the passenger's sentiment, such as an anxiety level or anger level.

The user support module 230 may assign the support request to an agent based on the passenger's state. For instance, based on a determination that the passenger is anxious, the user support module 230 may assign the support request to a currently available agent or the next available agent so that the waiting time of the passenger can be minimized. The agent, who receives the support request, can help the passenger to deal with the issue. The agent may communicate with the passenger, e.g., through an audio or video call.

The user datastore 240 stores ride information associated with users of the ride service, e.g., the users 135. In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. The historical data of the user may also include information associated with communications of AVs with the user for AV behaviors in historical rides taken by the user. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user preferences associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240. As another example, a learning module may learn user tolerance or preference for AV behaviors, e.g., based on information associated with communications of AVs with the user for AV behaviors in historical rides taken by the user. The learning module may learn that the user has a high tolerance for an AV behavior based on information indicating that the user had no bad feelings for the AV behavior undesirable in one or more previous rides. Similarly, the learning module may learn that the user has a low tolerance for a type of AV behavior based on information indicating that the user had negative sentiments towards the AV behavior in one or more previous rides.

The map datastore 250 stores one or more maps of environments through which the AVs 110 may travel. A map may be a semantic map or vector map. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 310 of the AVs 110 may be used to learn information about the AVs' environments. As one example, AVs may capture images in a residential neighborhood during a holiday season, and the images may be processed to identify which homes have holiday decorations. The images may be processed to identify particular features in the environment. For the holiday decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as holiday decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the AVs 110 in the fleet. The vehicle manager 260 includes a vehicle manager 260 and an AV interface (not shown separately from the vehicle manager 260). In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage. As another example, the vehicle manager 260 may include functionalities of the onboard computer 150, such as functionalities related to modeling restricted traffic zones.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Example Sensor Suite

Figure 3:
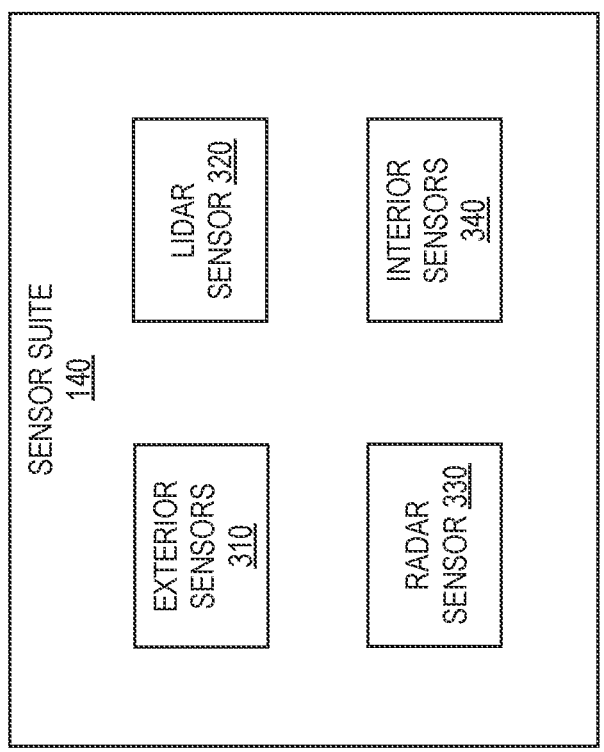
FIG. 3 is a block diagram showing a sensor suite, according to some examples of the present disclosure.

FIG. 3 is a block diagram showing the sensor suite 140, according to some embodiments of the present disclosure. The sensor suite 140 may be an onboard sensor suite of an AV, e.g., AV 110 in FIG. 1. The sensor suite 140 includes exterior sensors 310, a LIDAR sensor 320, a RADAR sensor 330, and interior sensors 340. The sensor suite 140 may include any number of the types of sensors shown in FIG. 3, e.g., one or more LIDAR sensors 320, one or more RADAR sensors 330, etc. The sensor suite 140 may have more types of sensors than those shown in FIG. 3, such as the sensors described with respect to FIG. 1. In other embodiments, the sensor suite 140 may not include one or more of the sensors shown in FIG. 3.

The exterior sensors 310 may detect objects in an environment around the AV. The environment may include a scene in which the AV operates. Example objects include objects related to weather (e.g., fog, rain, snow, haze, etc.), persons, buildings, traffic cones, traffic lights, traffic signs, barriers, vehicles, street signs, trees, plants, animals, or other types of objects that may be present in the environment around the AV. In some embodiments, the exterior sensors 310 include exterior cameras having different views, e.g., a front-facing camera, a back-facing camera, and side-facing cameras. One or more exterior sensors 310 may be implemented using a high-resolution imager with a fixed mounting and field of view. One or more exterior sensors 310 may have adjustable field of views and/or adjustable zooms.

In some embodiments, the exterior sensors 310 may operate continually during operation of the AV. In an example embodiment, the exterior sensors 310 capture sensor data (e.g., images, etc.) of a scene in which the AV drives. In other embodiment, the exterior sensors 310 may operate in accordance with an instruction from the onboard computer 150 or an external system, such as the vehicle manager 260 of the fleet management system 120. For instance, the onboard computer 150 or external system may request the exterior sensors 310 to detect restricted traffic zones and to generate sensor data that can be used for modeling the restricted traffic zones. Some of all of the exterior sensors 310 may capture sensor data of one or more objects in an environment surrounding the AV based on the instruction.

The LIDAR sensor 320 may measure distances to objects in the vicinity of the AV using reflected laser light. The LIDAR sensor 320 may be a scanning LIDAR that provides a point cloud of the region scanned. The LIDAR sensor 320 may have a fixed field of view or a dynamically configurable field of view. The LIDAR sensor 320 may produce a point cloud that describes, among other things, distances to various objects in the environment of the AV.

The RADAR sensor 330 may measure ranges and speeds of objects in the vicinity of the AV using reflected radio waves. The RADAR sensor 330 may be implemented using a scanning RADAR with a fixed field of view or a dynamically configurable field of view. The RADAR sensor 330 may include one or more articulating RADAR sensors, long-range RADAR sensors, short-range RADAR sensors, or some combination thereof.

The interior sensors 340 may detect the interior of the AV, such as objects inside the AV. Example objects inside the AV include passengers, client devices of passengers, components of the AV, items delivered by the AV, items facilitating services provided by the AV, and so on. The interior sensors 340 may include multiple interior cameras to capture different views, e.g., to capture views of an object inside the AV. The interior sensors 340 may be implemented with a fixed mounting and fixed field of view, or the interior sensors 340 may have adjustable field of views and/or adjustable zooms, e.g., to focus on one or more interior features of the AV. The interior sensors 340 may transmit sensor data to a perception module (such as the perception module 430 described below in conjunction with FIG. 4), which can use the sensor data to classify a feature and/or to determine a status of a feature.

In some embodiments, the interior sensors 340 include one or more input sensors that allow passengers to provide input. For instance, a passenger may use an input sensor to provide feedback on AV behaviors during the ride. The input sensors may include touch screen, microphone, keyboard, mouse, or other types of input devices. In an example, the interior sensors 340 include a touch screen that is controlled by the onboard computer 150. The onboard computer 150 may present messages on the touch screen and receive interaction of the passenger with the messages through the touch screen. A message may include information of one or more undesirable AV behaviors in the ride. In some embodiments, some or all of the interior sensors 340 may operate continually during operation of the AV. In other embodiment, some or all of the interior sensors 340 may operate in accordance with an instruction from the onboard computer 150 or an external system, such as the fleet management system 120.

Example Onboard Computer

Figure 4:
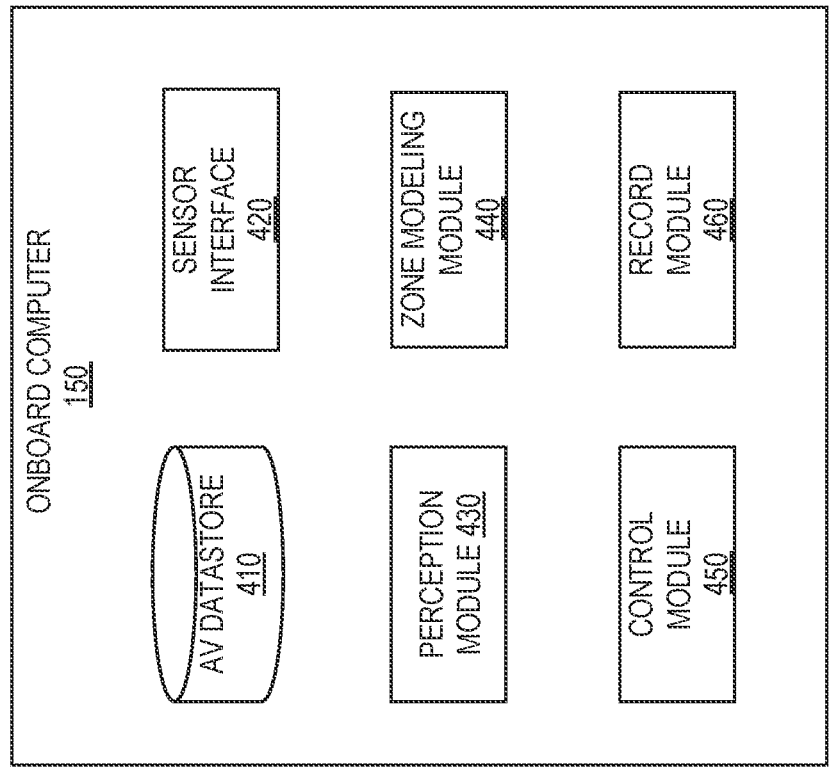
FIG. 4 is a block diagram showing an onboard computer, according to some examples of the present disclosure.

FIG. 4 is a block diagram showing the onboard computer 150 according to some embodiments of the present disclosure. The onboard computer 150 may control an AV, e.g., AV 110 in FIG. 1. As shown in FIG. 4, the onboard computer 150 includes an AV datastore 410, a sensor interface 420, a perception module 430, a construction zone identification module 440, a control module 450, and a record module 460. In alternative configurations, fewer, different and/or additional components may be included in the onboard computer 150. For example, components and modules for conducting route planning, controlling movements of the AV, and other vehicle functions are not shown in FIG. 4. Further, functionality attributed to one component of the onboard computer 150 may be accomplished by a different component included in the onboard computer 150 or a different system, such as the fleet management system 120.

The AV datastore 410 stores data associated with operations of the AV. The AV datastore 410 may store one or more operation records of the AV. An operation record is a record of an operation of the AV, e.g., an operation for providing a ride service. The operation may be a currently performed operation or a previously performed operation ("previous operation" or "historical operation"). The operation record may include information indicating operational behaviors of the AV during the operation. The operational behaviors may include sensor detection, movement, stop, battery charging, calibration, maintenance, communication with the fleet management system 120, communication with assistance agent, communication with user, communication with another AV, and so on. The operations record may also include data used, received, or captured by the AV during the operation, such as map data, instructions from the fleet management system 120, sensor data captured by the AV's sensor suite, and so on. In some embodiments, the AV datastore 410 stores a detailed map that includes a current environment of the AV. The AV datastore 410 may store data in the map datastore 250. In some embodiments, the AV datastore 410 stores a subset of the map datastore 250, e.g., map data for a city or region in which the AV is located.

The data in the AV datastore 410 may include data generated by the AV itself. The data may include sensor data capturing one or more environments where the AV operates, e.g., operates to provide services. The sensor data may be from the sensor suite 140 of the AV. The data in the AV datastore 410 may also include perception data that identifies one or more environmental conditions. The perfection data may be from the perception module 430 of the onboard computer 150 of the AV. The data may also include external data, e.g., data from other AVs or systems. For example, the data in the AV datastore 410 may include data (e.g., sensor data, perception, etc.) from one or more other AVs that capture one or more environments where the other AVs operate. As another example, the data in the AV datastore 410 may include data from the fleet management system 120, e.g., data about environmental conditions, instructions (e.g., operational plans) from the vehicle manager 260, etc. In yet another example, the data in the AV datastore 410 may include data from one or more third-party systems that provide information of environments where the AV operates. The AV may be in communication with the one or more third-party systems, e.g., through a network.

The sensor interface 420 interfaces with the sensors in the sensor suite 140. The sensor interface 420 may request data from the sensor suite 140, e.g., by requesting that a sensor capture data in a particular direction or at a particular time. For example, the sensor interface 420 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 420 may request the sensor(s) to capture data. The request may further provide one or more settings of a sensor, such as orientation, resolution, accuracy, focal length, and so on. The sensor interface 420 can request the sensor to capture data in accordance with the one or more settings.

A request for sensor data may be a request for real-time sensor data, and the sensor interface 420 can instruct the sensor suite 140 to immediately capture the sensor data and to immediately send the sensor data to the sensor interface 420. The sensor interface 420 is configured to receive data captured by sensors of the sensor suite 140, including data from exterior sensors mounted to the outside of the AV, and data from interior sensors mounted in the passenger compartment of the AV. The sensor interface 420 may have subcomponents for interfacing with individual sensors or groups of sensors of the sensor suite 140, such as a camera interface, a LIDAR interface, a RADAR interface, a microphone interface, etc.

The perception module 430 identifies objects and/or other features captured by the sensors of the AV. The perception module 430 may identify objects inside the AV based on sensor data captured by one or more interior sensors (e.g., the interior sensors 340). For instance, the perception module 430 may identify one or more passengers in the AV. In some embodiments, the perception module 430 identifies objects in the environment of the AV and captured by one or more sensors (e.g., the exterior sensors 310, LIDAR sensor 320, RADAR sensor 330, etc.). As another example, the perception module 430 determines one or more environmental conditions based on sensor data from one or more sensors (e.g., the exterior sensors 310, LIDAR sensor 320, RADAR sensor 330, etc.).

The perception module 430 may include one or more classifiers trained using machine learning to identify particular objects. For example, a multi-class classifier may be used to classify each object in the AV or in the environment of the AV as one of a set of potential objects, e.g., a passenger, a vehicle, a pedestrian, or a cyclist. As another example, a passenger classifier recognizes passengers in the AV, a pedestrian classifier recognizes pedestrians in the environment of the AV, a vehicle classifier recognizes vehicles in the environment of the AV, etc. The perception module 430 may identify facial expressions of people, such as passengers, e.g., based on data from interior cameras. The perception module 430 may identify travel speeds of identified objects based on data from the RADAR sensor 330, e.g., speeds at which other vehicles, pedestrians, or birds are traveling. As another example, the perception module 43—may identify distances to identified objects based on data (e.g., a captured point cloud) from the LIDAR sensor 320, e.g., a distance to a particular vehicle, building, or other feature identified by the perception module 430. The perception module 430 may also identify other features or characteristics of objects in the environment of the AV based on image data or other sensor data, e.g., colors (e.g., the colors of holiday-themed lights), sizes (e.g., heights of people or buildings in the environment), makes and models of vehicles, pictures and/or words on billboards, etc.

In some embodiments, the perception module 430 fuses data from one or more interior sensors 340 with data from exterior sensors (e.g., exterior sensors 310) and/or AV datastore 410 to identify environmental objects that one or more users are looking at. The perception module 430 determines, based on an image of a user, a direction in which the user is looking, e.g., a vector extending from the user and out of the AV in a particular direction. The perception module 430 compares this vector to data describing features in the environment of the AV, including the features' relative location to the AV (e.g., based on real-time data from exterior sensors and/or the AV's real-time location) to identify a feature in the environment that the user is looking at.

While a single perception module 430 is shown in FIG. 4, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The construction zone identification module 440 uses neural networks to identify construction zones that AVs need to drive through. The construction zone identification module 440 may obtain information of a construction zone and generate an input dataset that can be input into a neural network. The input dataset can include one or more detected construction zone objects, as well as other detected objects such as temporary warning lights, reflectors, construction signs, and NPCs. Construction zone objects can include traffic cones, construction drums, traffic barrels, tubular construction markers, vertical panels, and traffic barriers. The input dataset can also include one or more maps of the construction zone. A map of the construction zone can show features representing objects in the construction zone, such as traffic lanes, regions, vehicles, buildings, persons, trees, signs, traffic cones, and so on. The map can also include information associated with the features, such as classification, shape, size, orientation, location, material, or other attributes of the objects represented by the features.

The construction zone identification module 440 can generate the input dataset based on data from the AV datastore 410, sensor interface 420, perception module 430, fleet management system 120, one or more other AVs, other systems or devices, or some combination thereof. The construction zone identification module 440 can deploy a neural network to model the construction zone based on the input dataset. The neural network receives the input dataset. In some examples, the construction zone identification module 440 generates a link between every pair of two construction zone objects and generates a corresponding confidence score for each link indicating the confidence that the respective pair of construction zone objects are connected to form a construction zone edge. In various examples, the construction zone identification module 440 outputs a polygon zone of a region that indicates where to avoid as a construction zone, along with a zone identification and a list of associated construction zone objects. For instance, the neural network can output one or more edges associated with the construction zone. An edge associated with the construction zone can be an edge of the construction zone or an edge of a region in the construction zone. In some examples, the polygon zone and the list of associated construction zone objects can be used downstream for further processing and/or reasoning.

The onboard computer 150 can use the output(s) of the neural network to control the AV to drive through or pass the construction zone. The construction zone identification module 440 can provide the output(s) of the neural network to the control module 450 for the control module 450 to plan and control the driving of the AV surrounding or in the restricted traffic zone.

The control module 450 controls operations of the AV, e.g., based on information from the sensor interface 420 or the perception module 430. In some embodiments, the control module 450 controls operation of the AV by using a trained model, such as a trained neural network. The control module 450 may provide input data to the control model, and the control model outputs operation parameters for the AV. The input data may include models of construction zones from the construction zone identification module 440, sensor data from the sensor interface 420 (which may indicate a current state of the AV), objects identified by the perception module 430, data from the fleet management system, other data, or some combination thereof. The operation parameters are parameters indicating operation to be performed by the AV. The operation of the AV may include perception, prediction, planning, localization, motion, navigation, other types of operation, or some combination thereof.

The control module 450 may provide instructions to various components of the AV based on the output of the control model, and these components of the AV will operate in accordance with the instructions. In an example where the output of the control model indicates that a change of traveling speed of the AV is required given a prediction of traffic condition, the control module 450 may instruct the motor of the AV to change the traveling speed of the AV. In another example where the output of the control model indicates a need to detect characteristics of an object in the environment around the AV (e.g., detect a speed limit), the control module 450 may instruct the sensor suite 140 to capture an image of the speed limit sign with sufficient resolution to read the speed limit and instruct the perception module 430 to identify the speed limit in the image.

The record module 460 generates operation records of the AV and stores the operations records in the AV datastore 410. The record module 460 may generate an operation record in accordance with an instruction from the fleet management system 120, e.g., the vehicle manager 260. The instruction may specify data to be included in the operation record. The record module 460 may determine one or more timestamps for an operation record. In an example of an operation record for a ride service, the record module 460 may generate timestamps indicating the time when the ride service starts, the time when the ride service ends, times of specific AV behaviors associated with the ride service, and so on. The record module 460 can transmit the operation record to the fleet management system 120.

Example Construction Zone Identification

Figure 5:
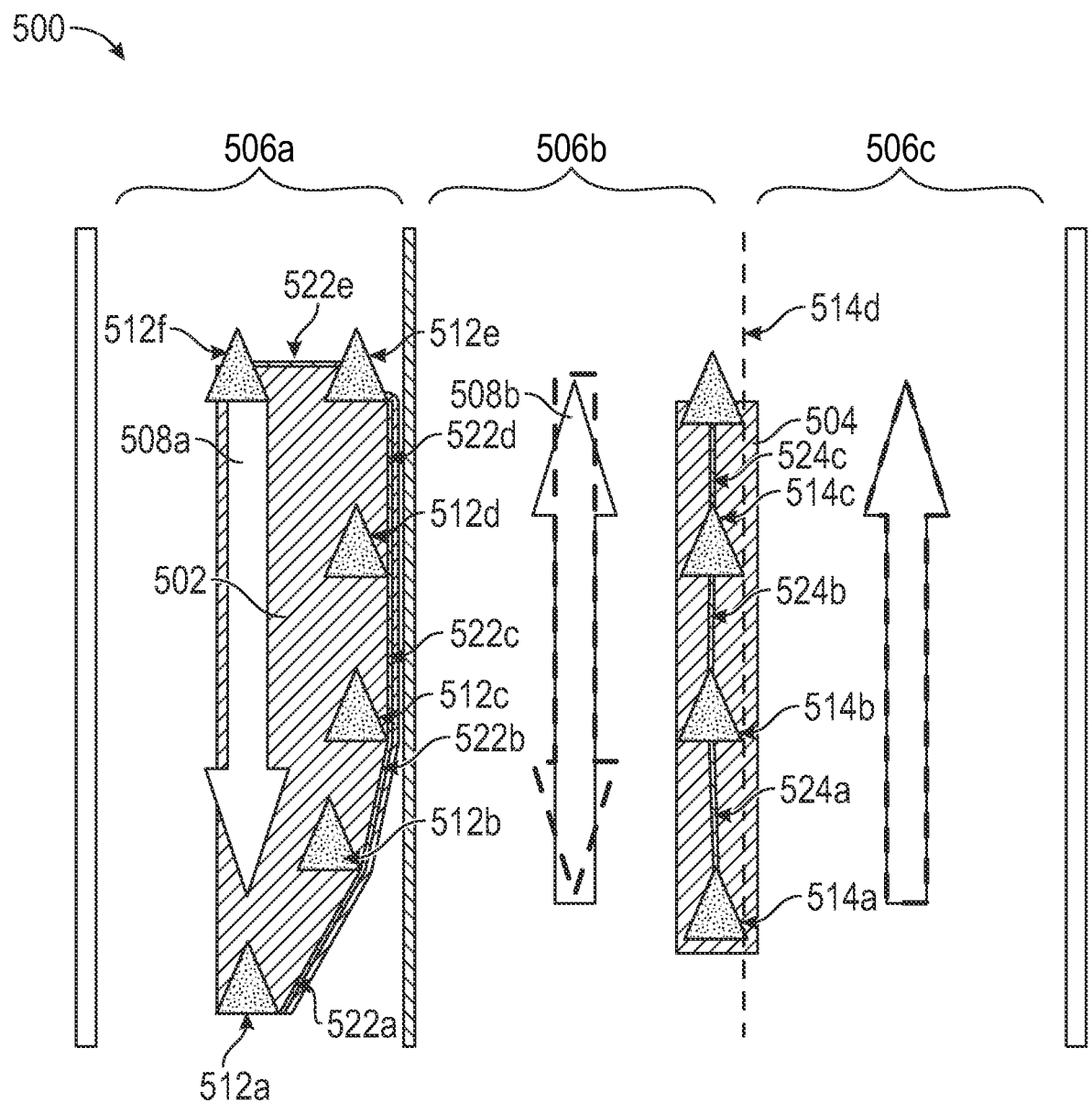
FIG. 5 is a diagram showing an example of construction zone modeling, according to some embodiments of the present disclosure.

FIG. 5 is a diagram 500 showing an example of construction zone modeling, according to some examples of the present disclosure. In various examples, a construction zone identification module receives as input identified construction zone objects. In particular, a vehicle identifies construction zone objects in its field of view and on a mapped roadway, and the locations of each of the identified construction zone objects are input to the construction zone identification module. Construction zone objects can include traffic cones, construction drums, traffic barrels, tubular construction markers, vertical panels, and traffic barriers. In various examples, all classes of objects are included in the input, and non-player characters (NPCs) can also be input to the construction zone identification module. In some examples, the objects are identified by a vehicle tracker having motion estimation and temporal fusion.

In various examples, a construction zone can include any area with construction zone objects on the road. Construction zone objects can include traffic cones, construction drums, traffic barrels, tubular construction markers, vertical panels, and traffic barriers. As shown in FIG. 5, the construction zone includes construction zone objects 512a-512f and 514a-514d. Construction zones can also be marked with temporary warning lights, reflectors, and construction signs. Construction zone objects can be used to mark temporary changes to the typical travel paths for vehicles on a roadway, which can include various roadway restrictions or directives such as lane closures, road closures, channelizations, etc. As illustrated in FIG. 5, the changes to the typical travel paths for vehicles on the roadway can indicate that vehicles are to travel along a different path than that indicated on the maps the AVs use to operate. Thus, it is important for accurate driving operations of the AVs for the AVs to be able to interpret, in real time (or near real time), the changes to the typical travel paths indicated by the construction zone objects. Navigating through construction zones generally includes mapping construction zone objects in the construction zone and understanding related surrounding non-player characters (e.g., other vehicles).

The construction zone model shown in FIG. 5 includes first 502 and second 504 construction zones. The first construction zone 502 is marked by six construction zone objects 512a-512f and closes off a first lane 506a of traffic in a first direction. In particular, a first arrow 508a indicates the original direction of traffic in the closed off lane 506a. The construction zone objects 512a-512f can be identified by a vehicle driving on the roadway, and input to a construction zone identification module. Similarly, the second construction zone 504 is marked by four construction zone objects 514a-514d and separates a second lane of traffic 506b from a third lane of traffic 506c. A second arrow 508b indicates the original direction of traffic in the second lane 506b, while a first dashed arrow indicates the new direction of traffic in the second lane 506b. Note that the direction of traffic in the second lane 506b is reversed in the construction zone. The construction zone objects 514a-514d can be identified by a vehicle driving on the roadway, and input to a construction zone identification module.

In some examples, construction zone polygons 502, 504 are manually labeled based on data from a set of frames in a segment (as opposed to labeling polygons frame-by-frame, individually in each frame). The generated polygons 502, 504 can then be applied to each frame of the set of frames, such that one labeled polygon is applied to every frame. Similarly, the construction zone objects 512a-512f and 514a-514d can be labeled one time, based on data from the set of frames in a segment. Since the construction zone objects are static (non-moving), the single set of labeled construction zone objects 512a-512f and 514a-514d can be applied across the frames in the segment. Thus, the labeled construction zone objects 512a-512f and 514a-514d can be applied to each frame of the set of frames, such that one labeled set of construction zone objects 512a-512f and 514a-514d is applied to every frame. In various examples, in certain frames, and from certain vantage points, vehicle sensors only have visibility of a subset of the construction zone objects 512a-512f and 514a-514d, and do not have visibility of one or more of the construction zone objects 512a-512f and 514a-514d, as discussed below with respect to FIGS. 6A-6D. Similarly, in certain frames, based on the vehicle vantage point, vehicle sensors have visibility of only partial construction zone regions.

The construction zone identification module connects the detected construction zone objects 512a-512f of the first polygon 502 to generate the ground truth edges 522a-522e. The ground truth edges 522a-522e define a boundary of the polygon 502 and indicate the blocked off traffic lane 506a. Similarly, the construction zone identification module connects the detected construction zone objects 514a-514d of the second polygon 504 to generate the ground truth edges 524a-524c. The ground truth edges 524a-524c define a boundary of the second polygon 504 and indicate the division between the traffic lanes 506b, 506c.

Example of the Generation of Predicted Edges

FIGS. 6A-6D show an example of the generation of predicted edges in construction zones 600, 620, 630, 640, according to various examples of the present disclosure. The predicted edges can be generated by a neural network, such as the construction zone identification module 440. In some examples, the construction zone and predicted edges can be identified by an onboard computer of the AV (e.g., the onboard computer 150). Additionally, in some examples, the construction zone can be identified via a cloud computer, which can be run by a fleet management system 120.

As shown in FIG. 6A, the construction zone 600 includes two groups of construction zone objects: a first group of construction zone objects 612a-612g mark a first area of the construction zone as indicated by the first polygon 602, and a second group of construction zone objects 614a-614d mark a second area of the construction zone as indicated by the second polygon 604. The first 602 and second 604 polygons are ground truth polygons and can be generated manually by human labelers. Each of the first 602 and second 604 polygons include polygon boundaries. In various examples, when the predicted edges are generated, the first 602 and second 604 polygons are used to prevent incorrect groupings of construction zone objects. That is, the first 602 and second 604 polygons can be used to ensure that the construction zone objects 612a-612g are in a first grouping and the construction zone objects 614a-614d are in a second grouping, and edges are not generated between the first and second groupings.

FIG. 6B shows the construction zone 620 including the first 602 and second 604 polygons and the first 612a-612g and second 614a-614d groups of construction zone objects. Additionally, FIG. 6B shows a vehicle 610 entering the construction zone. The vehicle 610 detects and identifies various ones of the construction zone objects 612a-612g and 614a-614d. However, some of the construction zone objects 612a-612g and 614a-614 d are not detected by the vehicle 610. In particular, construction zone objects 612c, 612d, 612f, 612g, 614b, and 614d are not detected by the vehicle. The predicted edges 622a, 622b, 622c, 624a, 624ab are generated frame-by-frame based on the visible (detected) construction zone objects 612a, 612b, 612e, 614a, 614c.

According to some examples, a method for generating the predicted edges includes detecting the visible construction zone objects in the ground truth polygons 602, 604, and then determining the distance from the detected construction zone objects to a polygon boundary. Any detected construction zone objects that are outside of a selected threshold distance from the polygon boundary are discarded (such that construction zone objects that are beyond a selected distance from the polygons are skipped). Using the construction zone objects within the selected threshold distance, edges are generated. In some examples, the predicted edges are generated by connecting various ones of the detected construction zone objects that are within the selected threshold distance. In some examples, graph neighbors are generated for each node.

FIG. 6C shows the construction zone 630 including the first 602 and second 604 polygons and the first 612a-612g and second 614a-614d groups of construction zone objects, and the vehicle 610 positioned between the first 602 and second 604 polygons. Due to the different location of the vehicle 610, the field of view of the vehicle 610 in FIG. 6C is different from the field of view of the vehicle 610 in FIG. 6B, and different construction zone objects are detected by the vehicle 610 in FIG. 6C. In particular, the construction zone objects 612a, 612b, 612c, 612d, 612g, 614a, 614b, and 614c are detected by the vehicle 610 in FIG. 6C. The construction zone object 612d however, is determined to be too far from the boundary of the polygon 602, so the construction zone object 612d is not used in the generation of predicted edges in FIG. 6C. The predicted edges shown in FIG. 6C are generated based on the visible (detected) construction zone objects 612a, 612b, 612c, 612g, 614a, 614b, and 614c. In particular, as shown in FIG. 6C, a first predicted edge is shown as a connection between the construction zone objects 612a and 612b, a second predicted edge is shown as a connection between the construction zone objects 612b and 612c, a third predicted edge is shown as a connection between the construction zone objects 612a and 612g, a fourth predicted edge is shown as a connection between the construction zone objects 614a and 614b, and a fifth predicted edge is shown as a connection between the construction zone objects 614b and 614c.

FIG. 6D shows the construction zone 640 including the first 602 and second 604 polygons and the first 612a-612g and second 614a-614d groups of construction zone objects, and the vehicle 610 positioned toward the end of the lane between the first 602 and second 604 polygons. Due to the different location of the vehicle 610, the field of view of the vehicle 610 in FIG. 6D is different from the field of view of the vehicle 610 in FIGS. 6B and 6C, and different construction zone objects are detected by the vehicle 610 in FIG. 6D. In particular, the construction zone objects 612b, 612d, 612e, 612f, 612g, 614b, 614c, and 614d are detected by the vehicle 610 in FIG. 6D. The construction zone object 612d, however, is determined to be too far from the boundary of the polygon 602, so the construction zone object 612d is not used in the generation of predicted edges in FIG. 6D. The predicted edges shown in FIG. 6D are generated based on the visible (detected) construction zone objects 612b, 612e, 612f, 612g, 614b, 614c, and 614d. In particular, as shown in FIG. 6D, a first predicted edge is shown as a connection between the construction zone objects 612b and 612e, a second predicted edge is shown as a connection between the construction zone objects 612e and 612f, a third predicted edge is shown as a connection between the construction zone objects 612f and 612g, a fourth predicted edge is shown as a connection between the construction zone objects 614b and 614c, and a fifth predicted edge is shown as a connection between the construction zone objects 614c and 614d.

According to various implementations, once the predicted edges are generated, the model is evaluated to determine how accurate the predicted edge generation is. If the construction zone objects are incorrectly connected, the effect of the mistake is determined. In some examples, a false connection can have little to no impact on drivability of a lane, for instance if the missed construction zone object sits between the two construction zone objects connected. In some examples, the false connection can result in a predicted edge that incorrectly blocks a lane. In some examples, a missed connection can allow a vehicle to drive into a non-drivable area.

Figure 7:
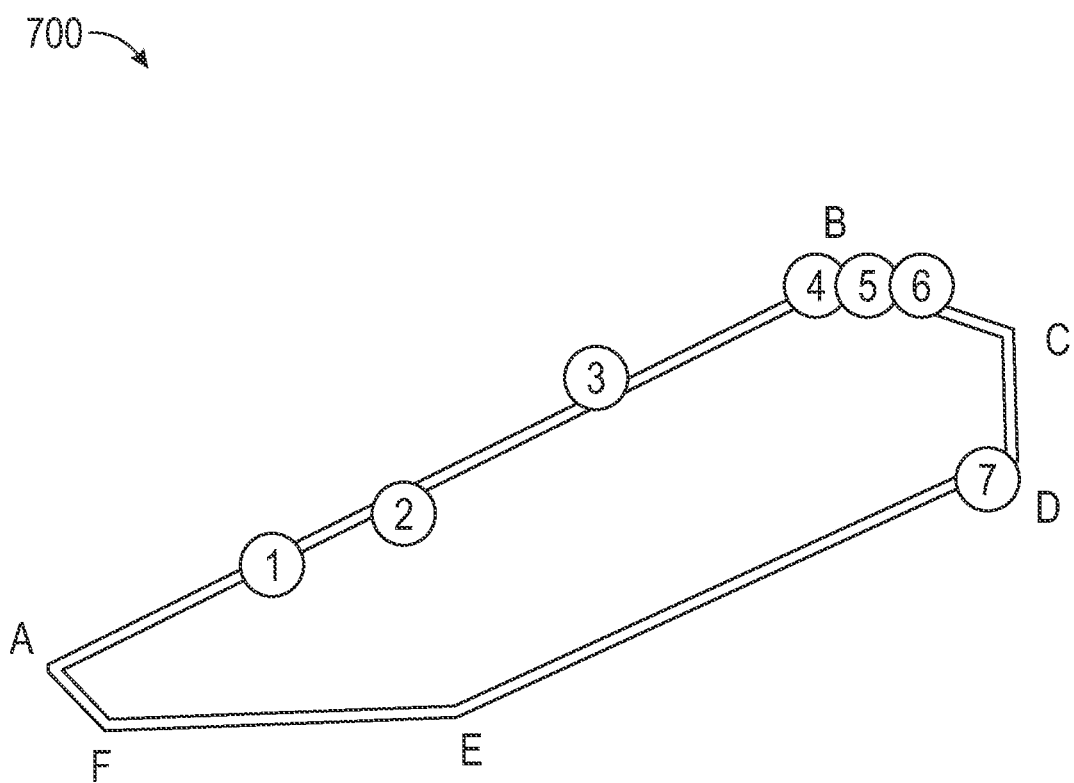
FIG. 7 illustrates an example for generating edge connections, according to various examples of the present disclosure.

FIG. 7 illustrates an example for generating edge connections, according to various examples of the present disclosure. Referring to FIG. 7, the polygon 700 defined by the points labeled A, B, C, D, E, F is a manually drawn polygon indicating a construction zone. The circular nodes 1, 2, 3, 4, 5, 6, 7 are the construction zone objects. In some examples, the polygon is defined as a series of connected polylines. For each of the polylines, the construction zone objects nearest to the respective polyline are identified and sorted based on the distance from the start point. Thus, if point A is the start point, the first construction zone object is the circular node 1. The nodes along the polyline connecting point A and point B are identified and sorted, such that the node order is node 1, node 2, node 3, node 4, and node 5. The nodes along the polyline connecting point B and point C are also identified and sorted, including node 4, node 5, and node 6. The polyline connecting points C and D includes only node 7, and the polyline connecting point D and E also includes only node 7. There are no nodes along the polyline between points E and F or along the polyline between points F and A. The nodes are then listed in order as identified along each polyline from point A to points B, C, D, E, F, and back to point A, such that the node order is (node 1, node 2, node 3, node 4, node 5), (node 4, node 5, node 6), node 7, node 7. The first node is appended to the end of the list, and duplicate nodes are deleted, leaving the node order as: node 1, node 2, node 3, node 4, node 5, node 6, node 7, node 1.

The connection between each of the nodes is compared to the polygon boundary line. For edges on the same boundary, the nodes are connected directly (node 1-node 2, node 2-node 3, node 3-node 4, node 4-node 5, node 5-node 6). However, for node connection edges that cross polygon boundaries, the edges are kept if distance from the node connection edge to the ground truth polygon is less than a selected threshold, and the distance from the node connection edge to the current edge lines is above a selected threshold.

Figure 8:
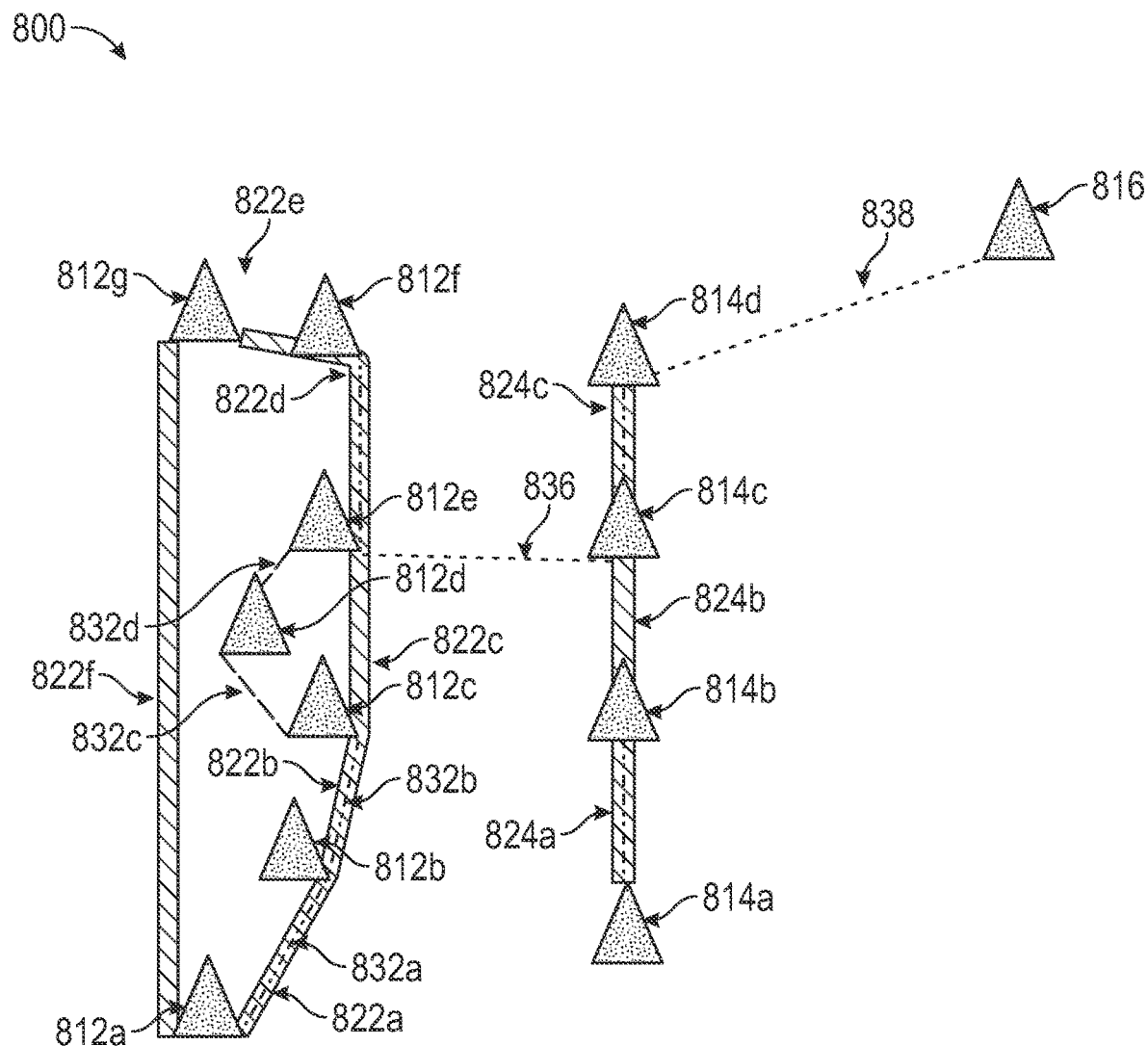
FIG. 8 illustrates an example output of a construction zone identification module including an edge detection error, according to some examples of the present disclosure.

FIG. 8 illustrates an example output of a construction zone 800 identification module including an edge detection error, according to some examples of the present disclosure. The construction zone shown in FIG. 8 includes the construction zone objects 812a-812g, 814a-814d, and 816. The solid lines 822a-822f and 824a-824c connecting the construction zone objects 812a-812g and 814a-814d are edge boundaries generated from first and second labeled polygons input to the construction zone identification module. The dashed lines 832a-832d, the first dashed line connecting construction zone object 812e to construction zone object 812f, the second dashed line connecting construction zone object 814a to construction zone object 814b, the third dashed line connecting construction zone object 814c to construction zone object 814d, the dashed line 836, and the dashed line 838 are predicted edges generated by the construction zone identification module. In various examples, the dashed lines 832a, 832b, the first dashed line connecting construction zone object 812e to construction zone object 812f, the second dashed line connecting construction zone object 814a to construction zone object 814b, the third dashed line connecting construction zone object 814c to construction zone object 814d are accurately predicted edges. The dashed lines 832c, 832d are inaccurate (instead, the edge should connect the construction zone objects 812c and 812e, and the construction zone object 812d should be ignored as an internal zone object). However, the dashed lines 832c, 832d create an internal edge that is unlikely to affect vehicle driving behavior, and is thus not a harmful mistake.

In contrast, the dashed line 836 connecting the construction zone object 812e in the first polygon (defined by the edge boundaries 822a-822f) with the construction zone object 814c in the second polygon (defined by the edge boundaries 824a-824c) creates an obstruction across a lane of travel, incorrectly indicating a road closure. Similarly, the dashed line 838 connecting the construction zone object 814d in the second polygon (defined by the edge boundaries 824a-824c) with the construction zone object 816 creates an obstruction across another lane of travel, incorrectly indicating a road closure. A false connection that blocks a lane can have a big impact on traffic flow, and thus a detrimental effect on vehicle and fleet operations. Similarly, an incorrect connection that allows the vehicle to drive into a non-drivable area can put the vehicle in a difficult situation and can have a detrimental effect on vehicle and fleet operations. While these types of incorrect connections can be remedied by connecting the vehicle with a remote assistant, the neural network in the construction zone identification module is trained to avoid this type of mistake. For example, as described herein, a distance between a polygon boundary and a predicted edge (dashed line) can be determined, and the predicted edge can be removed when the distance exceeds a threshold.

Example Method of Construction Zone Identification

Figure 9:
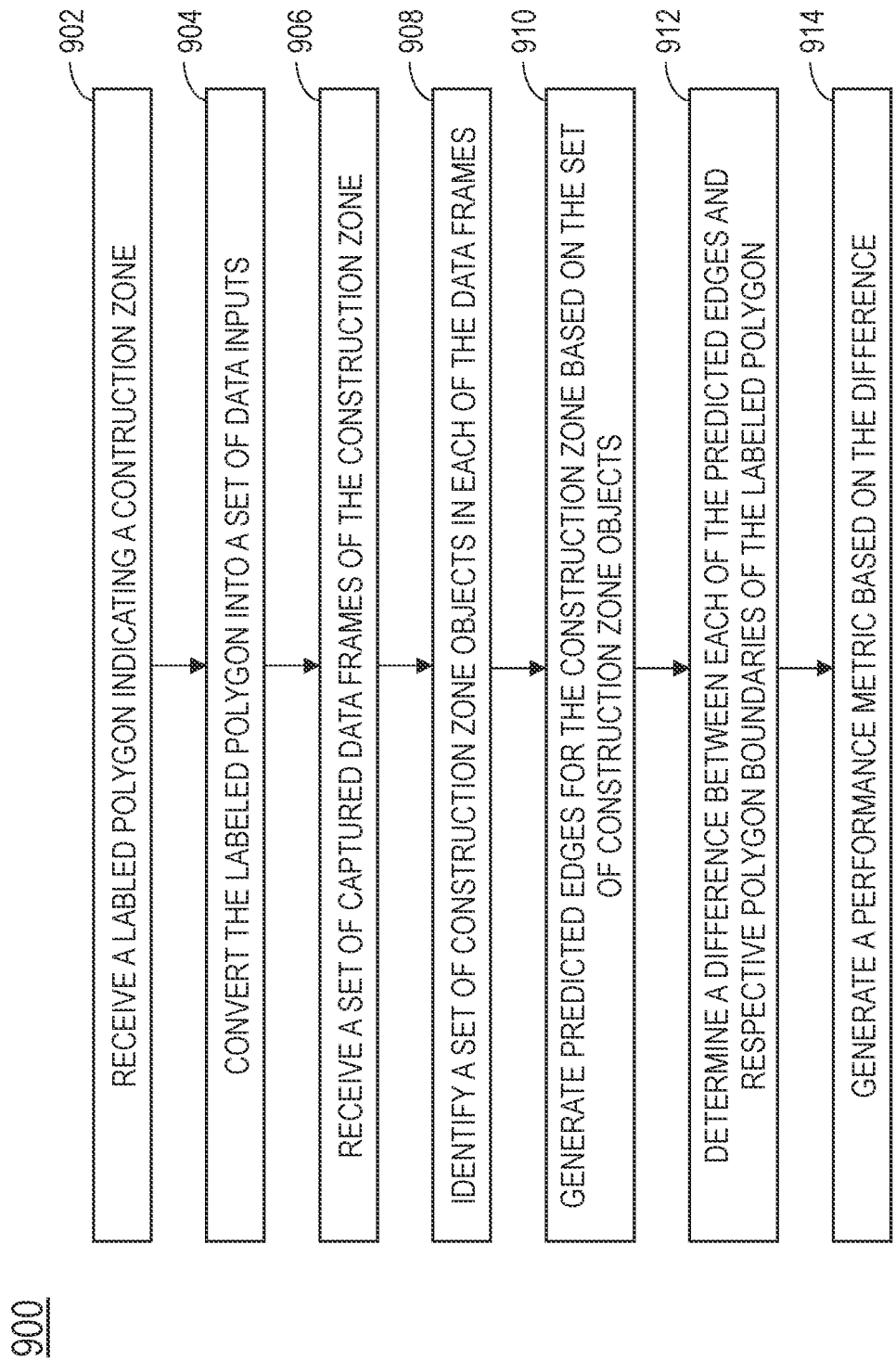
FIG. 9 is a flowchart showing a method 900 for construction zone identification, according to some examples of the present disclosure.

FIG. 9 is a flowchart showing a method 900 for construction zone identification, according to some examples of the present disclosure. In some examples, the method 900 can be used to train a neural network to identify construction zones. At step 902, a labeled polygon indicating a construction zone is received by a construction zone identification module. The polygon can be a manually labeled polygon of the construction zone. At step 904, the polygon is converted into a set of data inputs. For example, the polygon can be converted into a set of data inputs representing polygon boundaries, including polygon corner nodes, and lines connecting polygon nodes. In various examples, the construction zone identification module converts the labeled polygon to the set of data inputs.

At step 906, a set of captured data frames of the construction zone is received by the construction zone identification module. The captured data frames can include data captured by a vehicle sensor suite, such as the sensor suite 140 described herein. The captured data can include image data, LIDAR data, RADAR data, and any other data captured by the vehicle sensor suite. In various examples, the data is captured when the vehicle drives within a selected distance of the construction zone, and one or more construction zone objects are detectable by vehicle sensors. At step 908, construction zone objects in the one or more captured data frames are identified. As described above, the construction zone objects can include traffic cones, construction drums, traffic barrels, tubular construction markers, vertical panels, traffic barriers, as well as any other objects used to indicate a construction zone. Additionally, in various implementations, other objects in the one or more captured data frames are identified, including non-construction zone objects such as signs, fire hydrants, trees, people, other vehicles, etc.

At step 910, predicted edges for the construction zone are generated based on the set of construction zone objects. In some examples, a connection is generated between each of the identified construction zone objects, and each of the connections is given a confidence score. Connections having a confidence score below a selected threshold are removed, resulting in a set of connections having a confidence score at or above the selected threshold. The confidence score can be generated based on factors such as distance between the construction zone objects and the presence of any other construction zone objects between the two connected construction zone objects. In various examples, the connections in the set of connections are the predicted edges.

At step 912, the difference between each of the predicted edges and the respective polygon boundaries of the labeled polygon (and/or polygons) can be determined. In some examples, the set of connections is compared to the polygon boundaries. In some examples, the construction zone includes multiple polygons and determining the difference between the predicted edges and the respective polygon boundaries of the labeled polygons includes identifying which respective polygon boundary corresponds with each predicted edge. In some examples, a large difference between a predicted edge and any of the respective polygon boundaries can be an indication that the predicted edge is an incorrect edge.

At step 914, a performance metric is generated based on the difference between each of the predicted edges and the respective polygon boundaries. Many different factors can be used for generation of the performance metric. In some examples, the factors can include a difference between an area of the polygon and a corresponding area enclosed by connected predicted edges. In some examples, the distance a predicted edge extends outside the labeled polygon is an additional factor that can contribute to the performance metric, such that the further a predicted edge extends outside the labeled polygon the greater the negative effect on the performance metric. Similarly, in some examples, a polygon boundary having no corresponding predicted edge can have a negative effect on the performance metric.

Example Processing System

Figure 10:
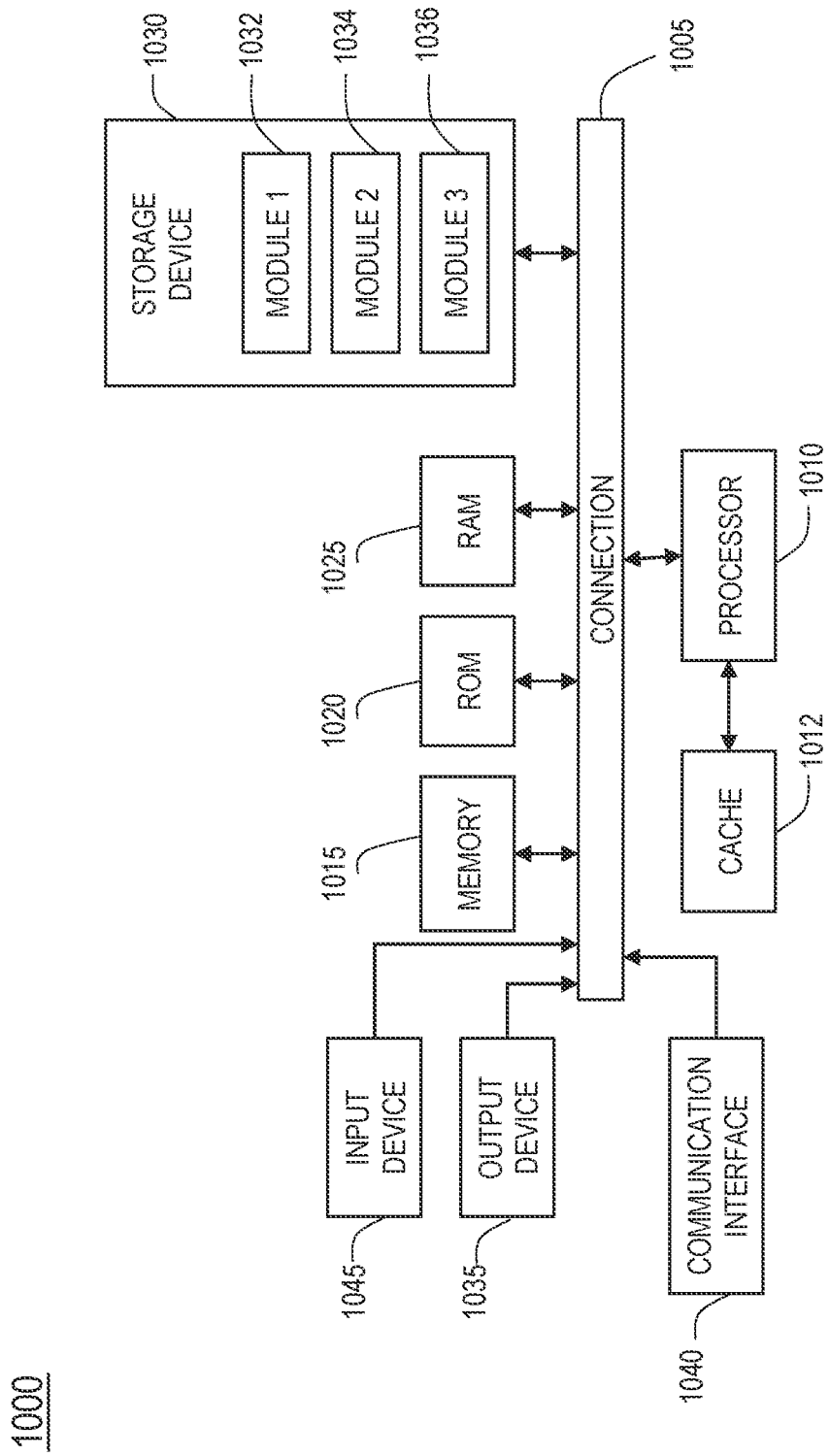
FIG. 10 illustrates an example processor-based system with which some aspects of the subject technology can be implemented.

FIG. 10 illustrates an example processor-based system with which some aspects of the subject technology can be implemented. In some examples, the processor-bases system 900 can be a central computer that can receive information from and transmit information to an onboard computer on a vehicle. In some examples, processor-based system 1000 can be any computing device making up, or any component thereof in which the components of the system are in communication with each other using connection 1005. In some examples, the processor-based system 1000 is in an autonomous vehicle. In some examples, the processor-based system, 1000 is in a robot and/or in a robotic arm. In some examples, the processor-based system is in a robotic cleaner, and/or the processor-based system is in a cleaning facility. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 can include a cache of high-speed memory 1012 connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 1030 can include software services, servers, services, etc., that when the code that defines such software is executed by the processor 1010, it causes the system 1000 to perform a function. In some embodiments, a hardware service that performs a particular function can include the software component stored in a computer-readable medium in connection with the necessary hardware components, such as processor 1010, connection 1005, output device 1035, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Select Examples

Example 1 provides a method for evaluating construction zone detection, comprising: receiving a labeled polygon indicating a construction zone; converting the labeled polygon into a set of data inputs; receiving a set of captured data frames of the construction zone; identifying a set of construction zone objects in each of the set of captured data frames; generating predicted edges for the construction zone based on the set of construction zone objects; determining a difference between each of the predicted edges and respective polygon edges of labeled polygon; and generating a performance metric based on the difference.

Example 2 provides a method, system, and/or vehicle of any of the preceding and/or following examples, wherein generating the predicted edges for the construction zone includes identifying a subset of the set of construction zone objects, including construction zone objects closest to the respective polygon edges.

Example 3 provides a method, system, and/or vehicle of any of the preceding and/or following examples, wherein determining the difference includes determining a distance between each of the predicted edges and respective polygon edges of labeled polygon.

Example 4 provides a method, system, and/or vehicle of any of the preceding and/or following examples, wherein determining the difference includes determining an area difference between an area of the labeled polygon, and an area of a shape produced using the predicted edges.

Example 5 provides a method, system, and/or vehicle of any of the preceding and/or following examples, wherein receiving a set of captured data frames includes receiving, for each frame in the set of captured data frames, image data, LIDAR data, and RADAR data.

Example 6 provides a method, system, and/or vehicle of any of the preceding and/or following examples, further comprising determining whether the difference between each of the predicted edges and respective polygon edges of labeled polygon exceeds a selected threshold.

Example 7 provides a method, system, and/or vehicle of any of the preceding and/or following examples, further comprising determining that a first difference between a first predicted edge and a first respective polygon edge exceeds the selected threshold, and removing the predicted edge.

Example 8 provides a method, system, and/or vehicle of any of the preceding and/or following examples, wherein generating predicted edges for the construction zone based on the set of construction zone objects includes: generating a set of connections including a connection between each of the construction zone objects in the set of construction zone objects, determining a confidence score for each connection in the set of connections, identifying a subset of connections having a confidence score above a selected threshold, wherein the predicted edges are in the subset of connections.

Example 9 provides a method, system, and/or vehicle of any of the preceding and/or following examples, wherein the labeled polygon is a first labeled polygon and further comprising: receiving a second labeled polygon; and determining, for each predicted edge, whether the predicted edge corresponds to a respective first labeled polygon boundary or a respective second labeled polygon boundary.

Example 10 provides one or more non-transitory computer-readable media storing instructions executable to perform operations, the operations comprising receiving a labeled polygon indicating a construction zone; converting the labeled polygon into a set of data inputs; receiving a set of captured data frames of the construction zone; identifying a set of construction zone objects in each of the set of captured data frames; generating predicted edges for the construction zone based on the set of construction zone objects; determining a difference between each of the predicted edges and respective polygon edges of labeled polygon; and generating a performance metric based on the difference.

Example 11 provides a method, system, non-transitory computer-readable media and/or vehicle of any of the preceding and/or following examples, wherein generating the predicted edges for the construction zone includes identifying a subset of the set of construction zone objects, including construction zone objects closest to the respective polygon boundary.

Example 12 provides a method, system, non-transitory computer-readable media and/or vehicle of any of the preceding and/or following examples, wherein determining the difference includes determining a distance between each of the predicted edges and respective polygon boundaries of the labeled polygon.

Example 13 provides a method, system, non-transitory computer-readable media and/or vehicle of any of the preceding and/or following examples, wherein determining the difference includes determining an area difference between a polygon area of the labeled polygon, and a predicted area of a shape produced using the predicted edges.

Example 14 provides a method, system, non-transitory computer-readable media and/or vehicle of any of the preceding and/or following examples, wherein receiving a set of captured data frames includes receiving, for each frame in the set of captured data frames, image data, LIDAR data, and RADAR data.

Example 15 provides a method, system, non-transitory computer-readable media and/or vehicle of any of the preceding and/or following examples, the operations further comprising determining whether the difference between each of the predicted edges and respective polygon boundaries of the labeled polygon exceeds a selected threshold.

Example 16 provides a method, system, non-transitory computer-readable media and/or vehicle of any of the preceding and/or following examples, the operations further comprising determining that a first difference between a first predicted edge and a first respective polygon boundary exceeds the selected threshold, and removing the predicted edge.

Example 17 provides a method, system, non-transitory computer-readable media and/or vehicle of any of the preceding and/or following examples, wherein generating predicted edges for the construction zone based on the set of construction zone objects includes: generating a set of connections including a connection between each of the construction zone objects in the set of construction zone objects, determining a confidence score for each connection in the set of connections, identifying a subset of connections having a confidence score above a selected threshold, wherein the predicted edges are in the subset of connections.

Example 18 provides a system for evaluating construction zone detection, comprising: a computer processor for executing computer program instructions; and one or more non-transitory computer-readable media storing computer program instructions executable by the computer processor to perform operations comprising: receiving a labeled polygon indicating a construction zone; converting the labeled polygon into a set of data inputs; receiving a set of captured data frames of the construction zone; identifying a set of construction zone objects in each of the set of captured data frames; generating predicted edges for the construction zone based on the set of construction zone objects; determining a difference between each of the predicted edges and respective polygon edges of labeled polygon; and generating a performance metric based on the difference Example 19 provides a method, system, non-transitory computer-readable media and/or vehicle of any of the preceding and/or following examples, wherein generating the predicted edges for the construction zone includes identifying a subset of the set of construction zone objects, including construction zone objects closest to the respective polygon boundary.

Example 20 provides a method, system, non-transitory computer-readable media and/or vehicle of any of the preceding and/or following examples, wherein generating predicted edges for the construction zone based on the set of construction zone objects includes: generating a set of connections including a connection between each of the construction zone objects in the set of construction zone objects, determining a confidence score for each connection in the set of connections, identifying a subset of connections having a confidence score above a selected threshold, wherein the predicted edges are in the subset of connections.

Example 21 provides a system for evaluating construction zone detection, comprising: a vehicle having a sensor suite configured to capture sensor data including a set of captured data frames of a construction zone, a perception module configured to identify a set of construction zone objects in each of the set of captured data frames and generate predicted edges for the construction zone based on the set of construction zone objects, and an onboard computer configured to transmit the set of captured data frames and the generated predicted edges to a central computer; and the central computer configured to receive the set of captured data frames and the generated predicted edges, receive a labeled polygon indicating the construction zone, convert the labeled polygon into a set of data inputs, determine a difference between each of the predicted edges and respective polygon edges of labeled polygon, generate a performance metric based on the difference.

Example 22 provides a method, system, non-transitory computer-readable media and/or vehicle of any of the preceding and/or following examples, wherein the perception module is configured to generate the predicted edges for the construction zone by identifying a subset of the set of construction zone objects, including construction zone objects closest to the respective polygon boundary.

Example 23 provides a method, system, non-transitory computer-readable media and/or vehicle of any of the preceding and/or following examples, wherein the perception module is configured to generate predicted edges for the construction zone based on the set of construction zone objects including: generating a set of connections including a connection between each of the construction zone objects in the set of construction zone objects, determining a confidence score for each connection in the set of connections, identifying a subset of connections having a confidence score above a selected threshold, wherein the predicted edges are in the subset of connections.

Example 24 provides a method, system, non-transitory computer-readable media and/or vehicle of any of the preceding and/or following examples, wherein the central computer is further configured to determine that the difference between each of the predicted edges and respective polygon boundaries of the labeled polygon exceeds a selected threshold.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along with similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A computer-implemented method comprising using a processor system to perform processor system operations configured to evaluate construction zone detection, the processor system operations comprising:
   receiving a labeled polygon indicating a construction zone;
   converting the labeled polygon into a set of data inputs;
   receiving in real time sensor data from sensor systems of vehicles;
   wherein the sensor data is received at a volume and in a variety to enable the vehicles to:
   self-navigate through a dynamic environment without a human driver; and
   identify a set of construction zone objects in the dynamic environment;
   generating predicted edges for the construction zone based on the set of construction zone objects;
   determining a difference between each of the predicted edges and respective polygon boundaries of the labeled polygon; and
   generating a performance metric based on the difference.

2. The computer-implemented method of claim 1, wherein generating the predicted edges for the construction zone includes identifying a subset of the set of construction zone objects, including construction zone objects closest to the respective polygon boundary.

3. The computer-implemented method of claim 1, wherein determining the difference includes determining a distance between each of the predicted edges and respective polygon boundaries of the labeled polygon.

4. The computer-implemented method of claim 1, wherein:
   receiving the real time sensor data comprises receiving a set of captured data frames of the construction zone;
   receiving the set of captured data frames includes receiving, for each frame in the set of captured data frames, image data, LIDAR data, and RADAR data.

5. The computer-implemented method of claim 1, further comprising determining whether the difference between each of the predicted edges and respective polygon boundaries of the labeled polygon
   exceeds a selected threshold.

6. The computer-implemented method of claim 5, wherein the processor system operations further comprise determining that a first difference between a first predicted edge and a first respective polygon boundary exceeds the selected threshold, and removing the predicted edge.

7. The computer-implemented method of claim 1, wherein generating predicted edges for the construction zone based on the set of construction zone objects includes:
   generating a set of connections including a connection between each of the construction zone objects in the set of construction zone objects,
   determining a confidence score for each connection in the set of connections, identifying a subset of connections having a confidence score above a selected threshold, wherein the predicted edges are in the subset of connections.

8. The computer-implemented method of claim 1, wherein the labeled polygon is a first labeled polygon and the processor system operations further comprise:

receiving a second labeled polygon; and determining, for each predicted edge, whether the predicted edge corresponds to a respective first labeled polygon boundary or a respective second labeled polygon boundary.

9. A system for evaluating construction zone detection, comprising:

an onboard computer of a vehicle;

wherein the onboard computer receives in real time sensor data from sensor systems of the vehicle navigating through a dynamic environment without a human driver;

wherein the onboard computer receives the sensor data at a volume and in a variety to enable a perception module of the vehicle to identify a set of construction zone objects in the dynamic environment;

wherein the sensor data includes a set of captured data frames of a construction zone;

wherein the perception module is configured to identify the set of construction zone objects in each of the set of captured data frames and generate predicted edges for the construction zone based on the set of construction zone objects, and the onboard computer configured to transmit the set of captured data frames and the generated predicted edges to a central computer; and the central computer configured to:

receive the set of captured data frames and the generated predicted edges, receive a labeled polygon indicating the construction zone, convert the labeled polygon into a set of data inputs, determine a difference between each of the predicted edges and respective polygon edges of labeled polygon; and generate a performance metric based on the difference.

10. The system of claim 9, wherein the perception module is configured to generate the predicted edges for the construction zone by identifying a subset of the set of construction zone objects, including construction zone objects closest to the respective polygon boundary.

11. The system of claim 9, wherein the perception module is configured to generate predicted edges for the construction zone based on the set of construction zone objects including:

generating a set of connections including a connection between each of the construction zone objects in the set of construction zone objects, determining a confidence score for each connection in the set of connections, identifying a subset of connections having a confidence score above a selected threshold, wherein the predicted edges are in the subset of connections.

12. The system of claim 11, wherein the central computer is further configured to determine whether the difference between each of the predicted edges and respective polygon boundaries of the labeled polygon exceeds a selected threshold.

13. The system of claim 12, wherein the central computer is further configured to, when a first difference between a first predicted edge and a first respective polygon boundary exceeds the selected threshold, remove the first predicted edge.

14. The system of claim 9, wherein the set of captured data frames includes, for each frame in the set of captured data frames, image data, LIDAR data, and RADAR data.

15. A non-transitory computer-readable media storing instructions executable to perform operations, the operations comprising:

receiving a labeled polygon indicating a construction zone;

converting the labeled polygon into a set of data inputs;

receiving in real time sensor data from sensor systems of vehicles;

wherein the sensor data is received at a volume and in a variety to enable the vehicles to:

self-navigate through a dynamic environment without a human driver; and identify a set of construction zone objects in the dynamic environment;

generating predicted edges for the construction zone based on the set of construction zone objects;

determining a difference between each of the predicted edges and respective polygon edges of the labeled polygon; and generating a performance metric based on the difference.

16. The non-transitory computer-readable media of claim 15, wherein generating the predicted edges for the construction zone includes identifying a subset of the set of construction zone objects, including construction zone objects closest to the respective polygon boundary.

17. The non-transitory computer-readable media of claim 16, wherein determining the difference includes determining a distance between each of the predicted edges and respective polygon boundaries of the labeled polygon.

18. The non-transitory computer-readable media of claim 16, the operations further comprising determining whether the difference between each of the predicted edges and respective polygon boundaries of the labeled polygon exceeds a selected threshold.

19. The non-transitory computer-readable media of claim 18, the operations further comprising determining that a first difference between a first predicted edge and a first respective polygon boundary exceeds the selected threshold, and removing the predicted edge.

20. The non-transitory computer-readable media of claim 18, wherein generating predicted edges for the construction zone based on the set of construction zone objects includes:

generating a set of connections including a connection between each of the construction zone objects in the set of construction zone objects, determining a confidence score for each connection in the set of connections, identifying a subset of connections having a confidence score above a selected threshold, wherein the predicted edges are in the subset of connections.

* * * * *